UNITED STATES PATENT OFFICE.

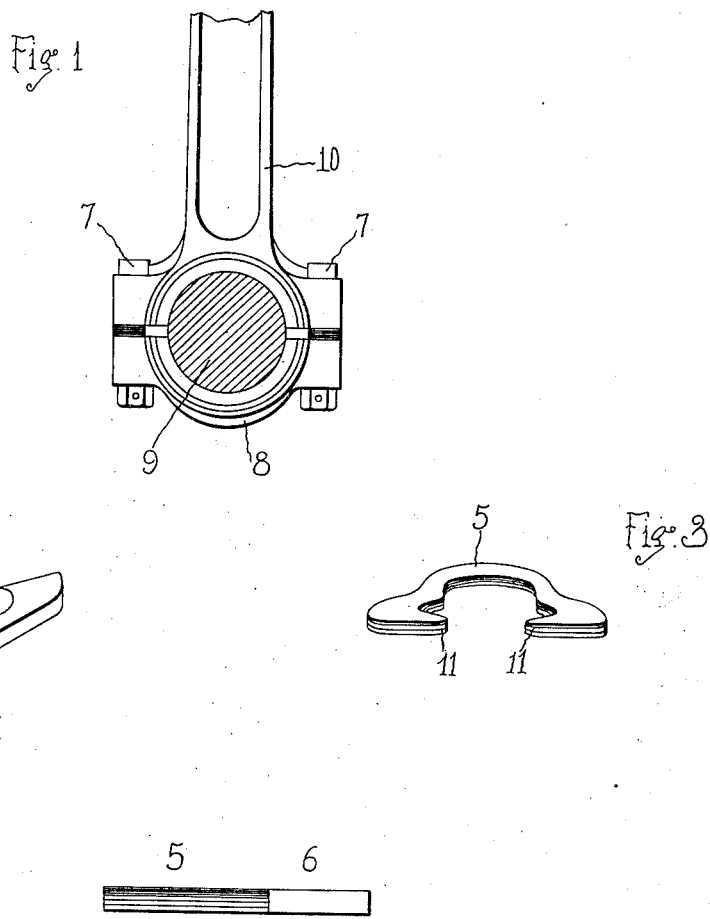

CHARLES REUBEN SHORT, OF DETROIT, MICHIGAN, ASSIGNOR TO GENERAL MOTORS CORPORATION, OF DETROIT, MICHIGAN, A CORPORATION OF DELAWARE.

BEARING-SHIM.

1,383,035.  Specification of Letters Patent.  Patented June 28, 1921.

Application filed April 24, 1919. Serial No. 292,324.

*To all whom it may concern:*

Be it known that I, CHARLES R. SHORT, a citizen of the United States, and resident of Detroit, Wayne county, State of Michigan, have invented certain new and useful Improvements in Bearing-Shims, of which the following is a specification.

My invention relates to spacing members or shims designed for use with bearing members to space them apart, and to provide for the tightening of the bearing by reducing the thickness of the spacing shims, thus permitting the bearing blocks to come closer to one another.

Heretofore when shims have been used in connection with bearing members the shims have commonly formed no part of the bearing surface provided by the bearing members, their sole function having been to space the bearing members apart and to provide for the tightening of the bearing by reducing the thickness of the shims. In the use of such shims they have commonly and purposely been so arranged that their edges which are the closest to the bearing are in fact spaced well away therefrom, as the metal of which the shims are made is commonly quite the reverse of a good bearing metal, and would cut or score the pin or shaft rotating within the bearing if the arrangement of the parts was such that the edge of the shim was in the bearing surface of the bearing with which it is used. Furthermore, the spacing of the edge of the shim away from the shaft or pin and the bearing surface of the bearing interrupts the continuity of the bearing surface, and leaves an opening through which oil may escape, which is objectionable, especially if a force feed lubricating system is used.

As distinguished from the above my invention contemplates and the object thereof is to provide a unitary combined shim and bearing member or device having a spacing portion which acts to space the bearing blocks apart as in shims heretofore in use, so far as function is concerned, and having also a bearing section or facing made from a good bearing metal and the edge of which lies in the bearing surface of the bearing with which the combined shim and bearing is used, thus providing a continuous and unbroken bearing surface which will effectively retain the film of oil whereby lubrication is provided in place between the bearing surface and the number rotating therein, while at the same time providing for the tightening of the bearing by reducing the thickness of the combined shim and bearing members.

I have illustrated my invention conventionally and as used in connection with the bearing at the end of a connecting rod which is connected with the crank pin of the crank shaft of an internal combustion engine, although the same may be used in connection with any bearing the bearing blocks of which may need to be tightened from time to time, and may obviously be used in devices other than internal combustion engines. Also, and although the drawing illustrates and the following description describes what I regard as the best form of my invention, it will be understood that the same includes such variations and modifications of the form thereof herein disclosed as will be obvious to those skilled in the art to which my invention relates, and such as come within the scope of the concluding claims wherein the features in which my invention consists are particularly pointed out.

In the drawing accompanying and forming a part of this specification:

Figure 1 is a view showing my improved combined shim and bearing used to space apart the bearing members at the end of a connecting rod.

Fig. 2 is a view upon a considerably larger scale showing my improved combined shim and bearing in perspective;

Fig. 3 is a similar view showing the spacing portion of my invention before it is combined with the bearing face or portion thereof, and;

Fig. 4 is a view upon a still larger scale showing my invention in end elevation, or as seen looking along the axis of the bearing with which it is used.

Referring now to the drawing, the combined shim and bearing wherein my invention consists is made up of or comprises a spacing portion designated by the reference numeral 5 and made from a comparatively hard and non-yielding or non-compressible metal, so that the same will space apart the bearings between which the device is used, and at the same time retain its shape under the stresses to which it is subjected when in use together with a bearing or facing portion 6 made from a metal having properties by virtue of which it is suitable for a bearing, and which metal is ordinarily soft and yieldable as compared with the harder and more resistant spacing portion of the device and as an example of which bearing metal the alloy commonly known as "Babbitt metal" may be cited.

The spacing and bearing portions are permanently joined together to thereby provide a single unitary structure, and a hole is provided in the combined article thus formed through which a bolt which secures the portions of the bearing with which the device is used together extends, two such bolts being shown at 7, 7 in Fig. 1 as employed to hold the lower bearing member or cap 8 of a bearing provided for a crank pin 9 to the lower end of a connecting rod 10 having a bearing or seat formed at its lower end, the two bearing members thus provided being shown as spaced apart by two combined shim and bearing members made in accordance with my invention.

In the preferred embodiment of my invention illustrated the spacing portion thereof is U-shaped in form and the two ends of said portion are embedded in the bearing metal portion of the device, suitable hooks 11 being provided at the ends of the spacing portion to thereby provide a stronger joint or connection between the two parts of the article. In making the device the hard metal spacing portion is placed in a suitable metal mold having a core fitting into the curved portion or bend thereof to thereby provide for the hole 12, and a space or cavity corresponding in form with the bearing metal portion, after which molten bearing metal is poured into the space aforesaid and runs about the free ends of the U-shaped portion and the hooks 11 thereof, thereby embedding the said free ends in the bearing metal portion and providing a strong and permanent joint between the two parts of the device. After the member thus formed is removed from the mold it is preferably compressed in a press acting upon its flat side portions to compact the bearing metal portion and secure a firm contact along the joint between the parts thereof, and reduce the finished article to a predetermined thickness.

The non-yieldable spacing portion 5 is preferably made up of a plurality of superposed plates or laminæ indicated by the horizontal lines in Figs. 1 and 4, and similarly in the other figures. These plates may be all of the same thickness, or a few thick plates may be used in connection with a number of thin plates, as indicated by the more closely spaced lines at the upper portions of Figs. 3 and 4.

The laminæ from which the spacing portion of the device is built up are preferably made from hard copper or brass, and they may be secured together by themselves, as by means of a solder film between them, or the binding action of the bearing metal facing or portion may be relied upon to hold the plates together and form the unitary device wherein my invention consists. The thickness of the constituent laminæ may of course vary in different services, although for the purpose herein mentioned I prefer to make the thick plates about 0.031 of an inch in thickness and the thin plates 0.003 of an inch or thereabout, the combined shim and bearing contemplated herein and illustrated having a total thickness of about 0.125 of an inch.

In view of the premises it will be appreciated that when the device disclosed is in use the stresses due to the holding bolts are borne by the hard metal spacing portion thereof, and that said portions, because of their hard and resistant and non-yieldable character, will not be deformed by the pounding action to which the bearing is subjected when in use. At the same time the edge of the bearing metal portion will lie in and form a part of the bearing surface regarded in its entirety, thus providing a continuous bearing surface and preventing the escape of oil, and preserving the continuity of the oil film upon which the lubrication of the bearing is dependent. When the bearing shall have become worn to such an extent as to require taking up or tightening, the combined shim and bearings are removed, and one or more of the laminæ, ordinarily the thin ones, are removed, thus reducing the thickness of the spacing portions of the device. If the adjustment of the bearing is attended to promptly when adjustment is needed it will be unnecessary to regard the bearing metal portions of the members, for, upon reassembling the bearing, such portions will be compressed and will flow sufficiently to permit a firm bearing to be established between the spacing portions and the surfaces of the bearing members with which they contact. In fact such slight excess in thickness as may be present in the bearing metal portion after the removal of a lamina is beneficial, rather than otherwise, for the compression of the said portion upon reassembling the bearing will force the metal thereof into firm engagement with the embedded ends of the spacing portion, thus reestablishing a firm connection between the two and strengthening the joint which may have become a little loose. If necessary or desirable, however, the bearing metal portion may be filed or scraped to reduce it to the same thinness as the spacing portion after one or more laminæ have been removed therefrom, as will be appreciated.

Having thus described and explained my invention, I claim and desire to secure by Letters Patent:

1. A combined shim and bearing having a spacing portion made from a comparatively hard and non-yieldable metal, and a facing portion made from a bearing metal and adapted to form a part of a bearing, said portions being permanently joined together, the unitary structure thus provided having a hole to accommodate a securing bolt.

2. A combined shim and bearing comprising a substantially U-shaped spacing portion made from a comparatively hard and non-yieldable metal, and a facing portion made from a bearing metal and with which the free ends of said spacing portion are permanently connected to thereby form a unitary structure.

3. A combined shim and bearing comprising a substantially U-shaped spacing portion made from a comparatively hard and non-yieldable metal, and a facing portion made from a comparatively soft bearing metal within which the free ends of said spacing portion are embedded, to thereby provide a unitary structure.

4. A combined shim and bearing comprising a spacing portion made from a comparatively hard and non-yieldable metal and a facing portion made from a comparatively soft bearing metal, a part of said spacing portion being embedded in said facing portion to thereby permanently connect said portions together, and the unitary structure thus provided having a hole to accommodate a securing bolt.

5. A combined shim and bearing comprising a spacing portion made up of a plurality of superposed hard and non-yieldable metallic plates, and a facing portion made from a bearing metal and adapted to form a part of a bearing, said parts being permanently joined together, the unitary member thus formed having a hole to receive a securing bolt.

6. A combined shim and bearing comprising a plurality of superposed U-shaped laminæ made from a hard and substantially non-compressible metal, and a facing portion made from a bearing metal and with which the free ends of said laminæ are permanently connected to thereby form a unitary structure.

7. A combined shim and bearing comprising a plurality of superposed U-shaped laminæ made from a hard and resistant metal, and a facing portion made from a softer and more easily compressible bearing metal and within which the free ends of said laminæ are embedded, to thereby provide a unitary device.

8. A combined shim and bearing comprising a plurality of superposed U-shaped laminæ of different thicknesses one from another and made from a resistant and substantially non-compressible metal, and a facing portion made from a more easily compressible bearing metal and within which the free ends of said laminæ are embedded, to thereby provide a unitary article.

9. A shim having a bearing alloy facing at one edge thereof.

In testimony whereof I affix my signature.

CHARLES REUBEN SHORT.

DISCLAIMER 1,383,035.—*Charles Reuben Short*, Detroit, Mich. BEARING-SHIM. Patent dated June 28, 1921. Disclaimer filed October 18, 1932, by the assignee, *General Motors Corporation*.

Hereby enters this disclaimer to all of claims 1, 5, and 9 and to that portion of claim 2 which covers a babbitt faced shim in which the free ends of the U-shaped spacing portion are not connected to the babbitt facing portion by embedment.

[*Official Gazette November 15, 1932.*]